June 22, 1943.  J. G. JACKSON ET AL  2,322,640
TROLLEY
Original Filed Dec. 16, 1935    2 Sheets-Sheet 1
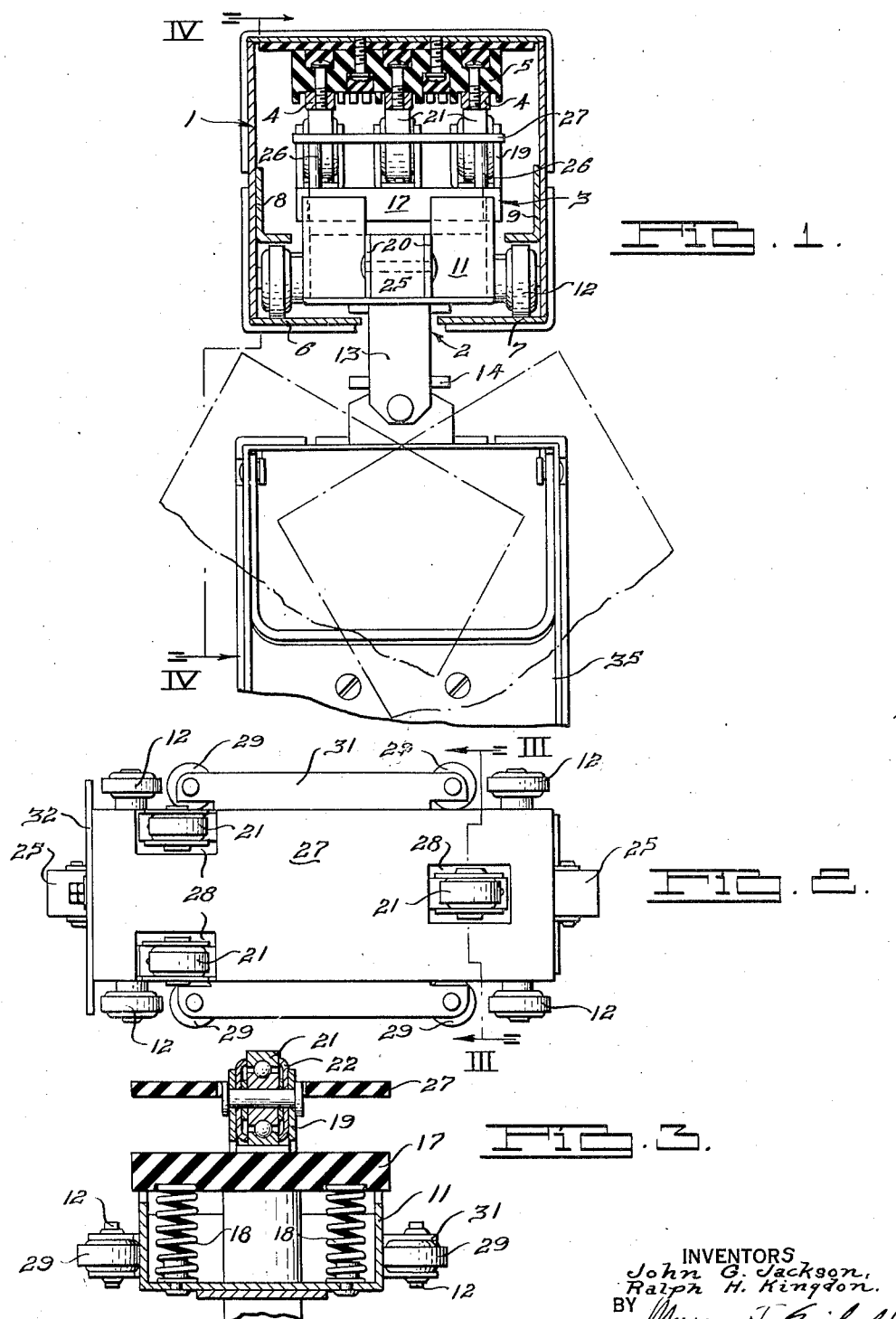
INVENTORS
John G. Jackson,
Ralph H. Kingdon.
BY
ATTORNEY June 22, 1943. J. G. JACKSON ET AL 2,322,640
TROLLEY
Original Filed Dec. 16, 1935 2 Sheets-Sheet 2

INVENTORS
John G. Jackson,
Ralph H. Kingdon.
BY
Myron J. Seibold
ATTORNEY

Patented June 22, 1943

2,322,640

UNITED STATES PATENT OFFICE 2,322,640

TROLLEY

John G. Jackson and Ralph H. Kingdon, Detroit, Mich., assignors to Square D Company, Detroit, Mich., a corporation of Michigan Original application December 16, 1935, Serial No. 54,554. Divided and this application February 27, 1942, Serial No. 432,556

8 Claims. (Cl. 191—45)

This invention relates to a current collector trolley for mobile electric distribution systems and constitutes a division of application, Serial No. 54,554 filed December 16, 1935, for Trolley duct.

The object of this invention is to provide an improved form of circuit controlling trolley for electrical distribution systems.

Another object of the invention is to provide a current collector trolley having a plurality of rollers with means for equalizing the contact pressure on the rollers.

Another object of the invention is to provide a current collector trolley with a cover or guard plate separating the carriage from the trolley conductors.

Other objects of the invention include the provision in a current collecting trolley of a simple polarizing means and of bumper means for reducing the shock of trolley collisions.

Other objects and features of the invention will be readily apparent to those skilled in the art from the following specification and appended drawings illustrating certain preferred embodiments of the invention in which:

Figure 1 is an enlarged cross sectional view of a current collecting trolley according to the present invention within a distribution duct.

Figure 2 is a top plan view of the trolley according to the present invention.

Figure 3 is a sectional view of the trolley on the line III—III of Figure 2.

Figure 4:
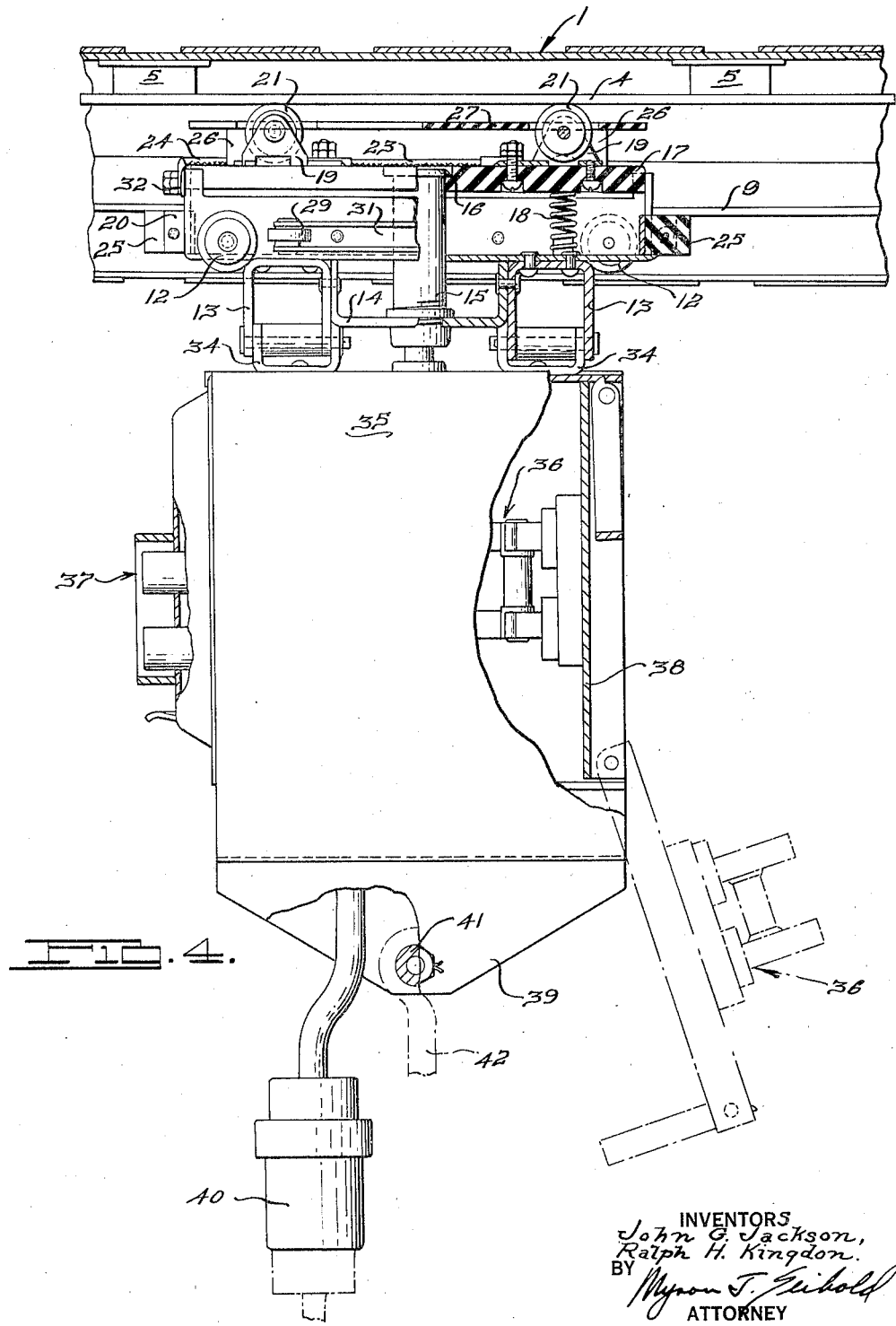
Figure 4 is a longitudinal sectional view of the trolley within the duct showing the current controlling attachments and tool support.

The trolley according to the present invention is shown within an enclosing duct 1 of generally rectangular shape formed by a plurality of sections into a continuously extending duct within which the trolley is supported and is adapted to travel. The bottom wall of the duct is provided with a slot 2 through which depend portions connected to the trolley which is indicated generally at 3. Three bus bars 4 are supported upon the interior top wall of the duct by being attached to insulating blocks 5 which are, in turn, secured to the duct wall. The bottom wall of the duct on either side of the slot 2, as at 6 and 7, forms runways upon which mechanical supporting and riding wheels for the trolley are supported. L-shaped brackets 8 and 9 are secured to the inner side walls of the duct with their horizontal flanges providing limiting surfaces preventing upward movement of the trolley wheels.

The trolley, according to the present invention, comprises a rigid supporting portion 11 carried on ball bearing rollers 12 which are supported for rolling movement on the trackways formed by the bottom wall surfaces 6 and 7. On the portion 11 are rigidly mounted U-shaped brackets 13 which extend through the slot 2 in the bottom wall of the duct. A U-shaped bracket 14 is rigidly connected to the brackets 13 and has a hollow cylindrical pipe or column rigidly secured thereon. The column 15 extends above the portion 11 and is provided adjacent its upper end with an out-turned flange 16. An insulating platform 17 is floatingly supported by the portion 11 by having an opening receiving the column 15 in slidable relation and by the springs 18 which bias the platform 17 to its upward position limited by its engagement with the flange 16, the springs 18 being positioned intermediate of a surface on the portion 11 and the underside of the platform 17 adjacent the corners of the platform, as shown in Figures 3 and 4. Upon the upper surface of platform 17 are mounted three U-shaped angle brackets 19, one of which is disposed adjacent one end of the platform and centrally thereof with the other two disposed adjacent the sides of the platform near its opposite end. Within each of these angle brackets is journaled a ball bearing current collector wheel 21. The wheels 21, as well as the wheels 12, are provided with dust guards 22, more particularly shown in Figure 3. Due to the positioning of the rollers 21 in V formation, a conventional three-point support is provided for the platform against the bus bars in the top of the duct. Circuit conductors 23 extend upwardly through the hollow column 15 and are connected to the brackets 19 supporting the collector rollers 21. A ground conductor 24 is electrically connected to portion 11 where it is grounded through the wheels 12 to the body of the duct 1. Rubber bumper elements 25 are provided adjacent each end of the member 11 to minimize shock in the event of impact with other trolleys in the duct or with the ends of the duct. These bumper elements 25 are disposed between the opposed sheet metal plate-like portions 20 rigidly secured to the portion 11. The upper surface of platform 17 is provided with a plurality of posts 26 upon which is supported an insulating plate 27 having openings 28 therein through which extend the current collector rollers 21. This plate 27 protects the circuit wires 23 and the surface of the platform 17 from metallic dust or other foreign matter which might be deposited from the bus bars or otherwise within the duct. It is to be noted that the platform 17 does not contact any current conducting parts so that metallic particles deposited thereon will not decrease the dielectric or creepage resistance of the path between the conducting parts on the carriage.

To prevent transverse rotation of the trolley within the duct, side thrust rollers 29 are provided. These are mounted on U-shaped brackets 31 rigidly secured to the sides of the portion 11 and the rollers 29 roll against the side walls of the duct to prevent twisting or turning movement of the trolley as force is applied thereto.

The trolley, as shown in Figure 2, is provided with a polarizing bar 32 which functions to properly polarize the current collector wheels 21 with the proper phases or conductors within the bus. This bar is placed at one side or end only of the trolley and is located above the upper surfaces of the supporting wheels 12, as shown in Figure 4 and extends into the path of movement of the supporting wheels as shown in Figure 2. The duct is provided with a gate portion, not shown, and at the gate portion and at one side only of the gate opening, the horizontal portions of the flange brackets 8 and 9 are provided with slots through which the polarizing bar 32 is adapted to pass if the trolley is inserted in the proper directional relation. If the trolley were inserted with its direction reversed 180°, the polarizing bar 32 would contact the under surface of the horizontal portions of the flange brackets 8 and 9 and would prevent insertion of the trolley. In this way the trolley contact rollers are polarized and the insertion of the trolley in the proper directional relation is ensured.

The two springs 18 mounted adjacent to the single roller 21, as seen at the right hand side of Figures 2 and 4, are only half as rigid as the two springs disposed beneath the opposite end of the platform 17. This results in twice the force being exerted at the last mentioned end of the platform and, as there are two rollers located there, the resulting contact pressure on all three circuit controlling rollers will be substantially equalized.

Journaled to the U-shaped brackets 13 are cooperating pairs of U-shaped brackets 34 to which is rigidly connected a cabinet 35 containing circuit controlling devices. Any desired circuit controlling instrumentality may be used within the cabinet 35, and as herein partially shown, there are provided a fused switching device 36 and a manual motor starter 37. As herein shown, the switch device 37 is constituted by fuses and contacts carried upon the door 38 of the cabinet which may be swung downwardly as shown in dotted lines in Figure 4. The circuit conductors 23 extend through the column 15 into the cabinet 35 wherein they pass through switch 36 and motor starter 37 and then from the bottom of the cabinet to a plug 40 adapted to be attached to a cooperating socket element connected to the individual tool supplied by the trolley. The bottom of the cabinet 35 is provided with brackets 39 connected together by a heavy pin 41 adapted to receive and carry a hook or other tool support indicated at 42.

If an operation is being carried out on one side of the duct and the trolley is pulled to move it along in the duct, the cabinet 35 will rotate on the swivel connection between brackets 13 and 34, as shown in dotted lines in Figure 2. This free swiveling movement together with the flange brackets 8 and 9 and the side thrust rollers 29 permits the trolley to travel freely within the duct regardless of the direction of the pull from the portable tool to which it is connected.

While certain preferred embodiments of the invention have been specifically disclosed, it is understood that the invention is not limited thereto as many variations will be readily apparent to those skilled in the art and the invention is to be given its broadest possible interpretation within the terms of the following claims.

What is claimed is:

1. In a trolley for an electrical distribution system, a wheeled support, a collector platform mounted on said support but movable relative thereto, means limiting the extreme positions of said platform, collector rollers on said platform mounted in V-formation, and a spring bias tending to separate said platform from said support, the bias adjacent the single contact roller at the apex of the V being only half as strong as that adjacent the pair of contact rollers whereby the contact pressure on the three rollers is equalized.

2. In a trolley for an electrical distribution system, a wheeled support, a collector platform mounted on said support but movable relative thereto, means limiting the extreme positions of said platform, springs interposed between said support and platform adjacent to the corners thereof, collector rollers on said platform, two of the said rollers being located adjacent to corners of said platform and a third roller being centrally located adjacent to the opposite end of the platform, the springs adjacent the corner rollers being twice as stiff as those at the opposite end in order to substantially equalize the contact pressure on the rollers.

3. In a trolley for an electrical distribution system, a wheeled support, a hollow central column rigid therewith, a collector platform having an opening receiving said column, a stop on the end of said column for limiting the movement of said platform, spring means biasing said platform toward said stop, collector rollers on said platform, and lead-off conductors extending through said column from said rollers.

4. In a trolley for an electrical distribution system, a wheeled support, a hollow central column rigid therewith, a collector platform having an opening receiving said column, a stop on the end of said column for limiting the movement of said platform, spring means biasing said platform toward said stop, and collector rollers on said platform arranged in V-formation, the bias adjacent to the pair of rollers remote from the apex roller being twice as stiff as that at the apex whereby the contact pressure of the three rollers is substantially equalized.

5. For use with a conduit having an elongated slot and bus bars mounted in said conduit and insulated therefrom, a carriage adapted to be supported in said conduit for movement therealong, trolley contacts on said carriage and insulated therefrom, means for urging said contacts into respective engagement with said bus bars, and a polarizing projection on one end only of said carriage.

6. A current collector trolley having an elongated, contact carrying, rigid carriage that rides along and within a duct on two or more sets of supporting rollers positioned at the ends of the carriage, the carriage having side thrust rollers and an upward thrust roller, and rubber block bumper means at the ends of the carriage positioned in the horizontal plane of the supporting rollers for the purposes described, the rubber blocks being disposed between opposed parallel sheet metal plate-like portions forming part of the trolley.

7. In a carriage for an electric trolley construction, a frame having a sheet metal floor and a central depending portion, an insulating base overlying said floor and supported on said frame with at least the main body portion of the base spaced above said floor, supporting rollers having transverse journals above said floor and below at least the top surface of said base, and current collectors carried by said base between the vertical planes of said supporting roller journals.

8. In an electric trolley construction, a carriage comprising a frame having a horizontal floor and a horizontal insulating cover spaced thereabove, collector contact supporting means housed between said floor and cover and including spring means, said cover having aperture means therein, and collector contact means on said supporting means and projected vertically upward through said aperture means by said spring means, said aperture means having a continuous rim conforming substantially to the horizontal cross section of said collector contact means passing therethrough but having a clearance therefor.

JOHN G. JACKSON.
RALPH H. KINGDON.